Figure 1:
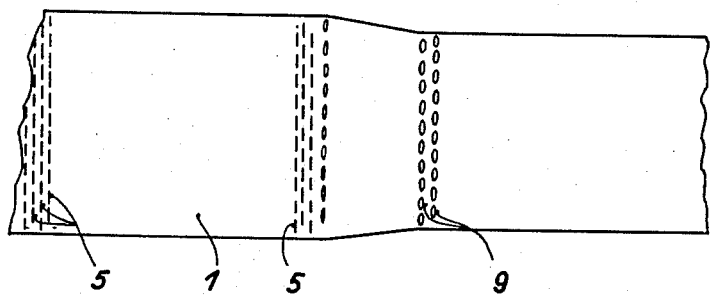

Jan. 15, 1952     A. GRÖZINGER     2,582,777
METHOD FOR THE MANUFACTURE OF SEPARATOR PLATES FOR
ELECTRIC STORAGE BATTERIES
Filed Sept. 27, 1949

Patented Jan. 15, 1952

2,582,777

UNITED STATES PATENT OFFICE 2,582,777

METHOD FOR THE MANUFACTURE OF SEPARATOR PLATES FOR ELECTRIC STORAGE BATTERIES

Alfred Grözinger, Stuttgart, Germany, assignor to Robert Bosch G. m. b. H., Stuttgart, Germany Application September 27, 1949, Serial No. 118,134
In Germany October 1, 1948

4 Claims. (Cl. 18—47.5)

The present invention relates to an improved method for the manufacture of separator plates for electric accumulators and the like storage batteries.

It has already been suggested to manufacture separators for storage batteries in which the separator plates are provided with slit-like cuts and are drawn out at right angles to these cuts to extend them. In these known methods of manufacture the separator plates, after having been provided with the slits, are formed into a net-like grid by stretching them similarly to methods of manufacturing an expanded metal. By this means the slits are extended to fairly substantial holes, the ribs of material lying between the slits then coming into a position at right angles to the face of the plates. These separators can in practice only be used as spacing elements between the electrode plates of the accumulator or storage battery in that the holes so produced are so large that the material falling away from the electrode plates passes into these holes and causes a short circuit between electrode plates of differing polarity. In order to avoid such short circuits occurring, it has been necessary to use a second plate as a separator which is as finely porous as possible in addition to the mesh-like grid plates which have been drawn out.

Methods of manufacture are also known in which the separator plates are provided with slits and the ribs between the slits are pressed out first on one side and then on the other relatively to the plane of the plate. In this case it has been proposed, in order to cut the slits in the separators, to heat them in a water bath or to use heated tools. These separators have essentially the same form and also the same properties as the separators mentioned above which are formed into a net-like grid by drawing them out after they have been slit.

Further, plates of microscopic porosity are known as separators which are provided with enlarged pores by dipping in sulphuric acid or by using electric spark discharges in order to reduce the electric resistance of the separators and to increase their permeability to fluids. These methods are difficult and expensive to carry out, and, moreover, are limited to materials of microscopic porosity which only present a weak resistance to the effect of the acid in the accumulator batteries.

According to the present invention separator plates formed of insulating material, for instance artificial resin or the like rendered plastic in known manner by warming, are first warmed, after being provided with slits or cuts, and are stretched for the purpose of widening the cuts whilst in the warm condition.

By stretching the separators in the warm condition, it is now possible, even with a small degree of stretching of the separator, to obtain a remaining deformation of its original shape so that the cuts can be expanded to quite small pore-like openings.

The method of manufacture of this invention is relatively simple and cheap, and is particularly suitable for mass production. The pore-like openings obtained by this method of manufacture allow a rapid equalising of the acid in the storage batteries. At the same time, however, they are so narrow that particles of material falling away from the electrode plates do not pass through them, and thus do not cause short circuits. A further advantage is that material such as synthetic resin or the like, which of itself is completely non-porous, can be used, which, moreover, has a high resistance to attack by the acid of the storage batteries.

Further according to the present invention, the warm separator pieces are corrugated after stretching so that the separators may simultaneously act as spacing elements between the electrode plates, whereby special devices for this purpose are now no longer necessary.

Figure 2:
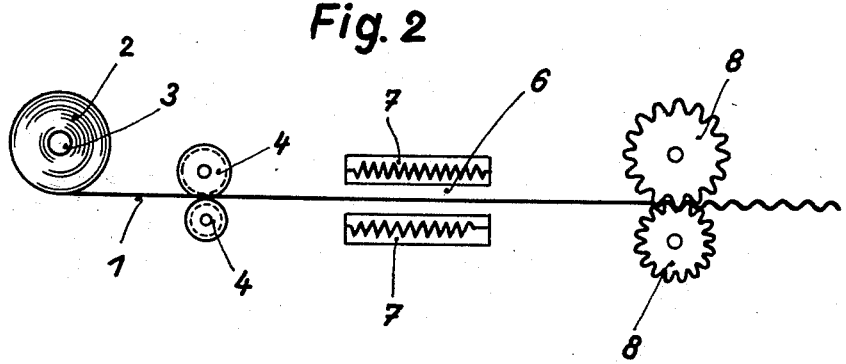

A method of carrying out the present invention, taken by way of example, is shown in the drawings, in which:

Fig. 1 is a view in elevation of a strip to be subjected to the method of this invention, Fig. 2 is a diagrammatic view showing how the method is performed.

As shown in Fig. 2, a strip of artificial resin, such as that known under the registered trademark "Igelit," is mounted in the form of a roll revoluble about an axis 3 or is connected to a rotatably mounted shaft. The strip 1 is passed between two tools 4 in the form of rollers which cut slits 5 in the strip, as shown in the arrangement of Fig. 1. After the slits have been cut, the strip is passed through a heating zone 6 between two electrically heated bodies 7, and is thereby warmed so that it may be readily stretched. Subsequent to the heating zone, the band is passed between two ribbed rollers 8, which give the strip a sinuous form, as shown in Fig. 2. The strip 1 is cut into lengths as desired by means operating subsequent to the rollers 8.

The rollers 8 have a higher peripheral speed than that of the rollers 4, so that these rollers 8 will tension the strip 1 which is thereby stretched after being warmed in the zone 6. By this stretching, the strip 1, as shown in Fig. 1, will be somewhat narrowed in width, and the slits 5 will be opened out into narrow pore-like openings 9.

The method of manufacture of this invention can also be used for the manufacture of short plates cut to desired size.

I claim:

1. A method of manufacture of separators for electric storage batteries which separators are formed of a continuous strip of thermoplastic synthetic material only deformable when heated comprising moving the strip and providing it with fine slits transversely to its length, rendering said strip plastic by conducting the strip through a heating zone and moving the strip from the heating zone at a higher speed so as to stretch the strip in the direction of its length and to open the slits and simultaneously corrugating said strip while still hot.

2. The method of forming storage battery separators from a thermoplastic synthetic material of the type deformable only when heated comprising the steps of continuously moving the material in sheet form, forming minute transverse slits in the material while it is being moved, heating the material after the slits have been formed therein to render the material plastic, axially stretching the material to open the slits and simultaneously corrugating the material, both of said last steps being performed while the material is still hot.

3. The method of forming storage battery separators from a thermoplastic synthetic material of the type deformable only when heated comprising the steps of continuously moving the material in web form, forming minute transverse slits in the material while it is being moved, heating the material after the slits have been formed therein and while the material is being moved to render the material plastic, tensioning the material to elongate it and open the slots and simultaneously corrugating the material, both of the last steps being performed while the material is still hot.

4. The method of forming storage battery separators from a thermoplastic synthetic material of the type deformable only when heated comprising the steps of continuously moving the material in web form, forming minute transverse slits in the material while it is being moved, heating the material after the slits have been formed therein and while the material is being moved to render the material plastic, stretching the material in the direction of its length and simultaneously transversely corrugating it.

ALFRED GRÖZINGER.

REFERENCES CITED

The following references are of record in the file of this patent:

UNITED STATES PATENTS

| Number | Name | Date |
|---|---|---|
| 318,010 | McHugh et al. | May 19, 1885 |
| 1,671,335 | Willard | May 29, 1928 |
| 1,756,328 | Andelin | Apr. 29, 1930 |
| 2,004,304 | Wells | June 11, 1935 |
| 2,079,584 | Hazell et al. | May 4, 1937 |
| 2,100,891 | Zinser | Nov. 30, 1937 |
| 2,338,210 | Snyder | Jan. 4, 1944 |
| 2,361,369 | Grebe et al. | Oct. 31, 1944 |
| 2,377,928 | Fielitz et al. | June 12, 1945 |
| 2,382,829 | Strickhouser et al. | Aug. 14, 1945 |
| 2,414,177 | Smith | Jan. 14, 1947 |